April 30, 1968     D. SCARAMUCCI     3,380,708
BODY PRESSURE RELIEVING VALVE AND SEALS THEREFOR
Filed April 12, 1965     3 Sheets-Sheet 1
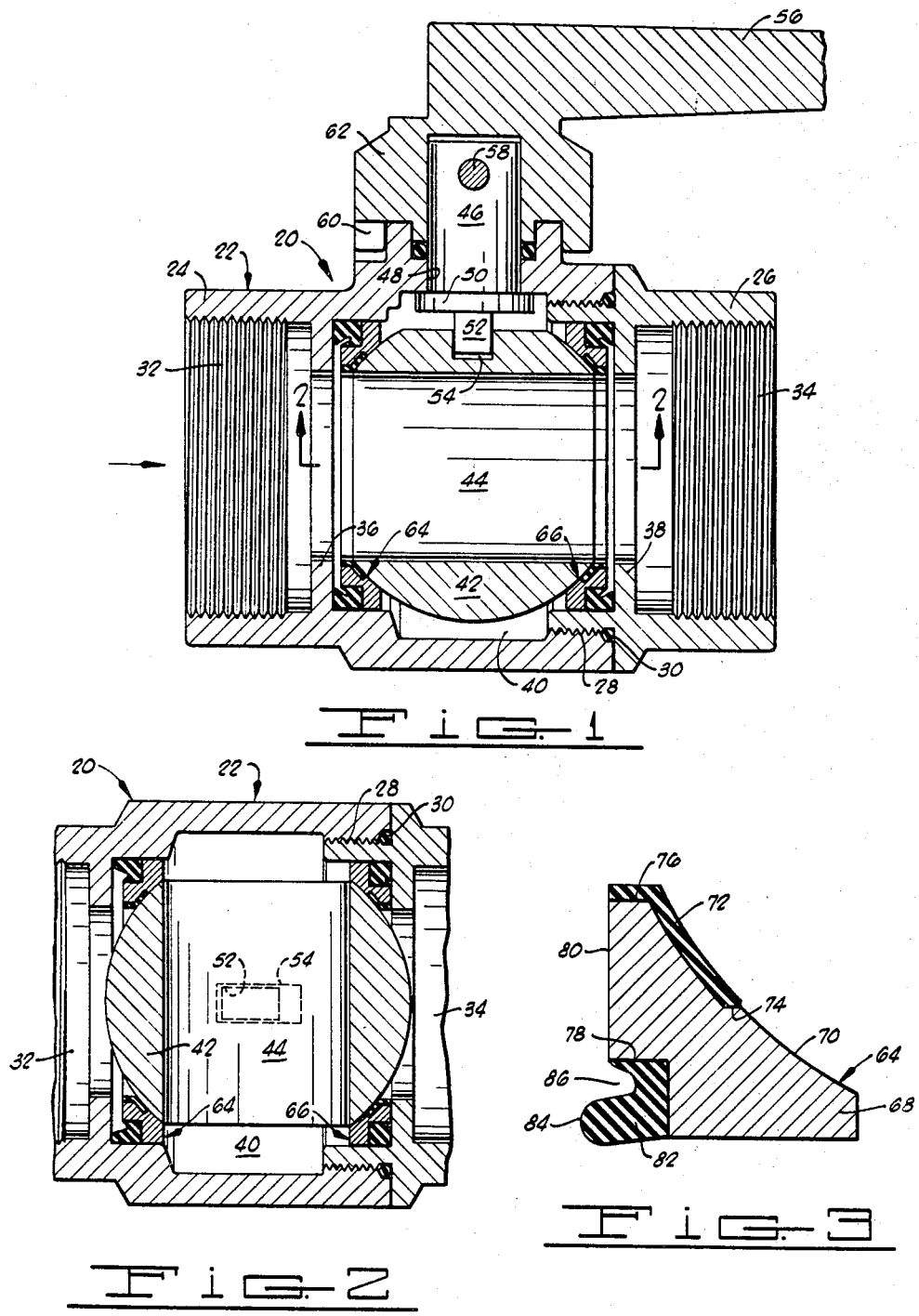

INVENTOR.
DOMER SCARAMUCCI
BY
ATTORNEYS

April 30, 1968 D. SCARAMUCCI 3,380,708
BODY PRESSURE RELIEVING VALVE AND SEALS THEREFOR
Filed April 12, 1965 3 Sheets-Sheet 3
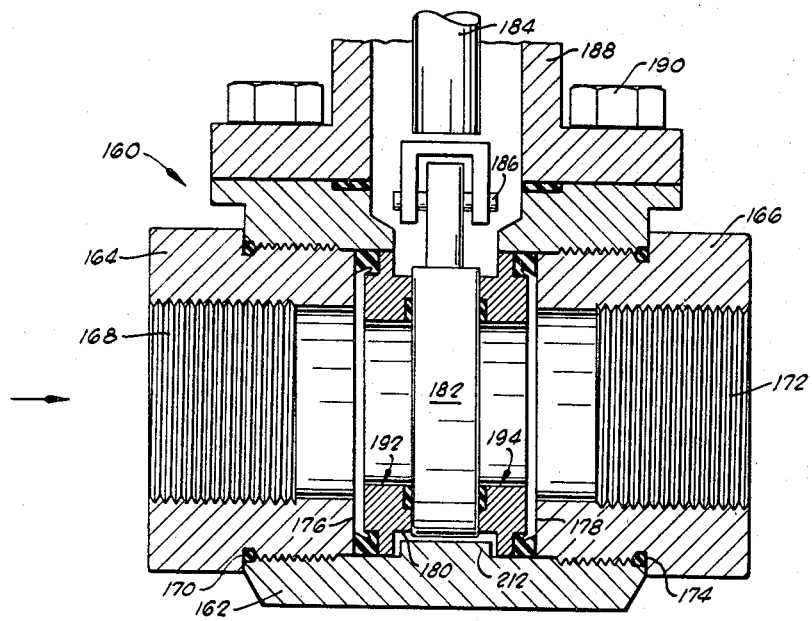
Fig.13
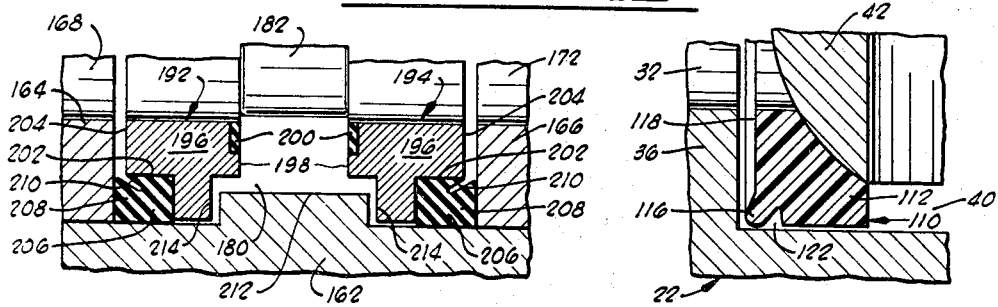
Fig.14
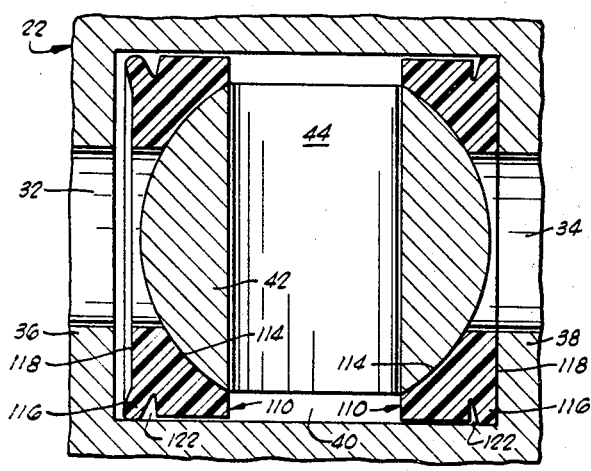
Fig.9
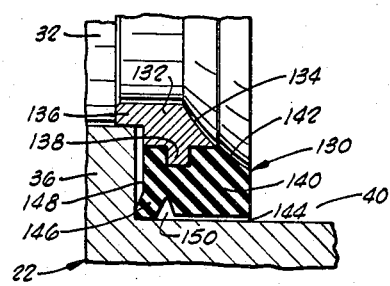
Fig.11
Fig.12
INVENTOR.
DOMER SCARAMUCCI
BY
Dunlap & Laney
ATTORNEYS United States Patent Office 3,380,708
Patented Apr. 30, 1968

3,380,708
BODY PRESSURE RELIEVING VALVE
AND SEALS THEREFOR
Domer Scaramucci, Oklahoma City, Okla., assignor to Balon Corporation, Oklahoma City, Okla., a corporation of Oklahoma
Filed Apr. 12, 1965, Ser. No. 447,246
12 Claims. (Cl. 251—172)

ABSTRACT OF THE DISCLOSURE

A valve having a floating valve member wherein excessive body pressure is relieved upstream. The upstream seat assembly is normally free to slide upstream away from the closed valve member, but in the event it becomes stuck against the valve member, a resilient seal at the outer edge of the seat assembly is deflected to a bypass position and excessive pressure bleeds around the seat into the upstream end of the valve.

---

This invention relates generally to improvements in valves, and more particularly, but not by way of limitation, to improved valve seat assemblies.

Practically all valves utilize seals arranged to seal against one or both sides of a valve closure member to prevent the leakage of fluid into the valve body when the valve is closed. However, such seals almost invariably leak and some fluid enters the valve body. When the valve is constructed to have both upstream and downstream seals, fluid in the valve body between the seals frequently gives rise to a dangerous condition. If the trapped fluid becomes heated, as by exposure of the valve to hot sunlight, the fluid can expand and rupture the valve body. In some instances, operating personnel can be injured by flying fragments or fire occasioned by rupturing of the valve.

Some valves have been constructed with an upstream seating ring assembly having a seal thereon, wherein the upstream seating assembly is designed to be moved upstream away from the valve closure member when the pressure in the valve body exceeds the upstream pressure. However, such seating assemblies are subject to corrosion, and foreign matter contained in the fluid handled by the valve tends to pack around the seating assembly to such an extent that the seating assembly becomes stuck in the valve body and will not move upstream away from the valve closure member, even under high body pressure conditions. It will then be seen that the body pressure can become sufficiently excessive to give rise to a dangerous condition.

In its broader aspects, the present invention contemplates a novel valve seat assembly having a surface shaped to mate with a valve closure member and provide a seal between the seat and the valve closure member. The seat assembly also includes a separate resilient seal arranged to sealingly engage the walls of the valve body when pressure is applied thereto from the respective end of the valve body, but which is designed to be deflected or at least partially collapsed when the pressure in the valve chamber exceeds the pressure at the respective end of the valve body, whereby the excessive pressure in the valve chamber can bleed around the seat assembly into the respective inlet or outlet of the valve. Thus, the pressure in the valve chamber will not become excessive and will not rupture the valve body or give rise to a dangerous condition.

An object of this invention is to increase the safety of valves.

Another object of this invention is to provide a valve construction wherein fluid will not be trapped in the valve chamber of the valve.

Another object of this invention is to provide a valve construction wherein the pressure in the valve body will not become excessive by virtue of fluid being trapped in the valve chamber.

An further object of this invention is to provide a valve seat assembly which will effectively minimize the leakage of fluid around the assembly into the valve chamber, but will allow the leakage of fluid from the valve chamber around the assembly into the respective end of the valve in which the assembly is used.

Another object of this invention is to provide a valve seat assembly which will provide an effective seal between the walls of a valve chamber and one side of the valve closure member in the valve chamber, but will allow the bleed-off of excessive pressure from the valve chamber.

A still further object of this invention is to provide a valve which may be economically constructed and yet which will have a long service life.

Other objects and advantages of the invention will be evident from the following detailed description when read in conjunction with the accompanying drawings which illustrate the invention.

In the drawings:

FIG. 1 is a vertical sectional view through a ball valve constructed in accordance with this invention.

FIG. 2 is a sectional view taken along lines 2—2 of FIG. 1.

FIG. 3 is an enlarged cross-sectional view through the upstream seat assembly utilized in the valve of FIG. 1.

FIG. 9 is a partial horizontal cross-sectional view through a ball valve showing the operation of the FIG. 8 seat assemblies when the valve is closed.

FIG. 11 is a view similar to FIG. 10 showing an alternate operation of the upstream seat assembly when the body pressure becomes excessive.

FIG. 12 is an enlarged cross-sectional view through another modified seat assembly and the cooperating portion of the valve body.

FIG. 13 is a vertical sectional view through a gate valve utilizing the novel seat assemblies of this invention.

FIG. 14 is an enlarged cross-sectional view of the lower portion of the gate valve construction of FIG. 13 more clearly illustrating the seat construction.

Figure 4:
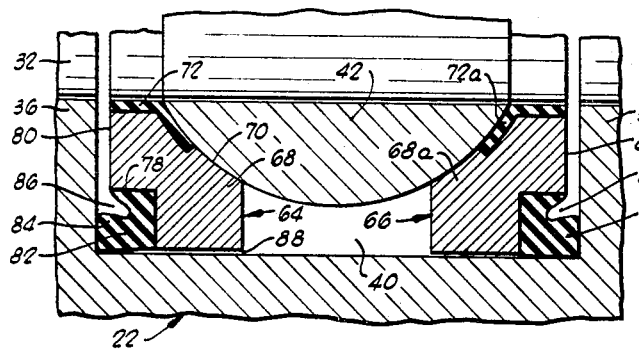
FIG. 4 is an enlarged view similar to the lower portion of FIG. 1 illustrating the operation of the seat assemblies when the valve is open.

Referring to the drawings in detail, and particularly FIG. 1, reference character 20 generally designates a valve which includes a valve body 22 formed in two sections 24 and 26 interconnected by threads 28 and sealed by an O-ring 30. The inlet 32 and the outlet 34 of the valve body 22 may be internally threaded, as shown, or otherwise suitably adapted for connection with adjacent portions of a flow line (not shown). An internal flange 36 is provided at the inner end of the inlet 32 and an inwardly extending flange 38 is provided in the valve body at the inner end of the outlet 34 to provide a valve chamber 40 in the central portion of the valve body.

A valve closure member in the form of a ball 42 having the usual port 44 therethrough is positioned in the valve chamber 40 to control the flow of fluid through the valve in a conventional manner. The ball 42 is turned through the medium of a stem 46 extending through a mating aperture 48 formed in the upper portion of the valve body 22. The stem 46 is retained in operating position by a circumferential flange 50 positioned inside the valve chamber 40 and larger in diameter than the aperture 48. The inner end 52 of the valve stem 46 is rectangular in configuration and slidingly fits in a rectangular slot 54 formed in the outer surface of the ball 42. As shown by the dashed lines in FIG. 2, the length of the slot 54 is greater than the transverse width of the stem portion 52, such that the ball 42 is free to move axially in the valve chamber 40 when the valve is closed, as will be more fully hereinafter set forth.

A handle 56 is secured to the outer end of the valve stem 46 by a pin or the like 58 for manual turning of the ball 42. A lug 60 is formed on the lower end of the handle hub 62 and is positioned to mate with a corresponding lug (not shown) on the valve body 22 to limit the turning movements of the ball 42 to an arc of 90° as is conventional in ball valve constructions.

An upstream seat assembly 64 is positioned in the valve chamber 40 between the ball 42 and the flange 36 to provide a seal between the ball 42 and the adjacent walls of the valve chamber, as will be more fully set forth below. A downstream seat assembly 66 is positioned in the valve chamber 40 between the ball 42 and the downstream flange 38. The downstream seat assembly 66 is constructed in the same manner as the upstream seat assembly 64, so it will only be necessary to explain the upstream seat assembly 64 in detail. The corresponding structural portions of the downstream seat assembly 66 (where referenced) have been given the same reference numerals with the subscript *a* added.

As shown in FIG. 3, the upstream seat assembly 64 comprises a ring 68 of high strength material, such as metal, having a front face 70 shaped to mate with the adjacent outer surface of the ball 42. An elastic material seal 72 is bonded in a mating groove 74 in the front face 70 to sealingly engage the outer surface of the ball 42. The seal ring 72 is preferably formed of a relatively soft elastic material and projects from the front face 70 only a very short distance, such as .002 to .005 inch, to sealingly engage the valve ball 42. Since the portion of the seal ring 72 projecting beyond the front face 70 is substantially less than the total thickness of the seal ring, the seal ring will be placed in a state of high stress when the front face 70 contacts the ball 42. As also shown in FIG. 3, the elastic seal ring 72 extends from the inner periphery 76 of the seating ring 68 over approximately one-half of the length of the front face 70 to be positioned adjacent the inlet 32 of the valve. It may further be noted that the elastic sealing ring 72 may be extended toward the inlet 32 over the inner periphery of the seating ring 68 if desired.

An annular groove 78 is formed in the outer end face 80 of the seating ring 68 and extends to the outer periphery of the seating ring. A relatively soft elastic seal ring 82 is bonded to the walls of the groove 78 to form a seal between the seating ring 68 and the adjacent walls of the valve chamber, as will be described. As will be observed in FIG. 3, the outer end portion 84 of the seal ring 82 forms a resilient lip portion extending an appreciable distance beyond the outer end face 80 of the seating ring. An annular groove 86 is formed in the sealing ring 82 radially inward of the lip portion 84. That portion of the sealing ring 82 radially inward of the groove 86 does not extend beyond the outer end face 80 of the seating ring such that the groove 86 will be constantly exposed to fluid which has access to the outer end face 80 of the seating ring, for purposes to be described. It will also be observed that the sealing ring 82 projects radially beyond the outer periphery of the seating rings 68 in the relaxed condition of the sealing ring.

As shown in FIG. 4, the outer diameter of the seating ring 68 is slightly smaller than the diameter of the adjacent portion of the valve chamber 40, whereby the seating ring 68 fits loosely in the valve chamber and provides an annular space 88 around the outer periphery thereof. However, since the sealing ring 82 projects beyond the outer periphery of the seating ring 68, the sealing ring 82 sealingly engages the walls of the valve chamber 40. Furthermore, the lip portion 84 of the sealing ring 82 projects a sufficient distance beyond the outer end face 80 of the seating ring 68 to be compressed and distorted by the adjacent body flange 36 when the upstream seat assembly 64 is positioned in the valve chamber 40 and the valve ball 42 is centered or placed in a neutral position in the valve chamber. It will be observed in FIG. 4 that the downstream seat assembly 66 is positioned in a similar manner with respect to the downstream body flange 38 when the ball 42 is centered in a valve chamber.

With the valve in an open position as shown in FIG. 4 and with the ball 42 thus centered in the valve chamber 40, the fluid in the inlet 32 will tend to flow radially outward between the upstream body flange 36 and the outer end face 80 of the upstream seating ring 68. This fluid will gain access to the groove 86 and further distort the lip portion 84 of the sealing ring 82 against the walls of the valve chamber 40 to prevent the leakage of fluid around the outer periphery of the upstream seat assembly 64. It will be recalled that the sealing ring 82 is bonded to the walls of the groove 78.

Figure 5:
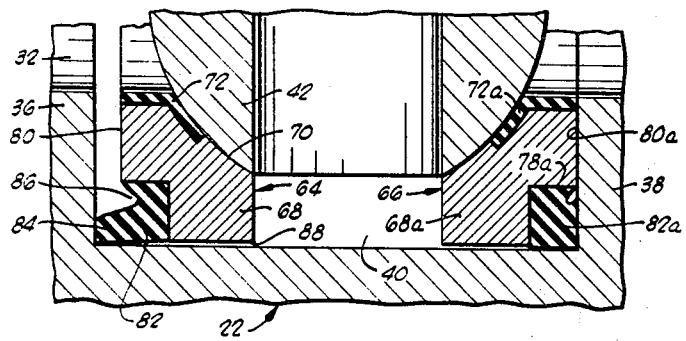
FIG. 5 is a view similar to FIG. 4 showing the operation of the seat assemblies when the valve is closed.

When the ball 42 is turned to a closed position as illustrated in FIG. 5, the upstream fluid pressure will react across the ball and move the ball downstream, since the ball is loosely connected to the valve stem 46 as previously described in connection with FIG. 2. The downstream movement of the ball 42 will move the downstream seat assembly 66 downstream until the outer end face 80*a* engages the downstream body flange 38. It will then be noted that the sealing ring 82*a* on the downstream seat assembly will then be substantially fully distorted into the groove 78*a* in the corresponding seating ring 68*a* and will prevent the leakage of fluid which may be present in the valve chamber around the outer periphery of the downstream seating ring 68*a*. It will also be noted that the seal 72*a* of the downstream seat assembly 66 remains in engagement with the outer surface of the ball 42 to provide an effective downstream seal for the valve.

When the ball 42 moves downstream as described, the upstream seat assembly 64 will also be subjected to the upstream fluid pressure and will be moved downstream away from the body flange 36 as shown in the left hand side of FIG. 5. However, the lip portion 84 of the sealing ring 82 is of sufficient size to remain in engagement with the body flange 36 when the ball 42 and the upstream seat assembly 64 have been moved the maximum distance downstream as shown in FIG. 5. Thus, the upstream pressure will continue to be present in the groove 86 of the sealing ring 82 and distort the lip portion 84 of the sealing ring 82 into tight sealing engagement with the adjacent walls of the valve chamber 40 and prevent the leakage of fluid from the inlet around the outer periphery of the upstream seat assembly 64 into the valve chamber 40 between the seat assemblies 64 and 66. As previously indicated, the upstream seating ring 68 is normally free to slide in the valve chamber 40 and thus permit the upstream seat assembly 64 to follow the downstream movement of the ball 42. It may also be noted that the upstream sealing ring 72 will remain in engagement with the ball 42 to provide an effective upstream seal.

Figure 6:
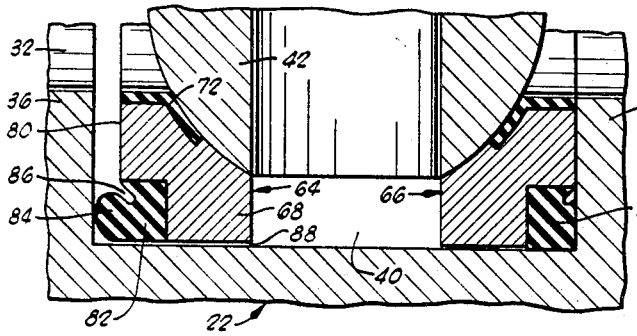
FIG. 6 is another view similar to FIG. 4 showing the operation of the upstream seat assembly when the pressure in the valve body becomes excessive.

In the event fluid should leak from the upstream side of the ball 42, either between the seat assembly 64 and the ball, or between the seat assembly 64 and the adjacent walls of the valve chamber 40, the pressure in the valve chamber 40 may exceed the upstream pressure. In such event, the higher pressure existing in the valve chamber 40 will normally react across the upstream seat assembly 64 and move this assembly back upstream toward the body flange 36 to remove the front face 70 of the seating ring 68 from the surface of the ball 42 and allows the excessive body pressure to bleed upstream. However, in the event the upstream seating ring 68 becomes stuck in the valve chamber 40, as by the packing of foreign matter in the annular space 88 or the partial fusion of the seating ring 68 to the valve body by corrosion, the body pressure will be exerted upstream through the annular space 88 and at least partially collapse the resilient seal ring 82; whereupon, the excess pressure can bleed around the upstream seat assembly back into the inlet 32. As will be observed in FIG. 6, when the pressure in the annulus 88 exceeds the pressure existing in the annular groove 86 of the sealing ring 82, the lip portion 84 of the sealing ring 82 will be bent radially inward away from the walls of the chamber 40 and away from the upstream body flange 36 to break the seal previously provided by the ring 82 and allow the excess pressure to leak around the seal ring 82 toward the inlet 32 of the valve. The downstream seat assembly 66 will remain in engagement with the downstream body flange 38 to provide an effective downstream seal as shown at the right hand side of FIG 6.

Figure 7:
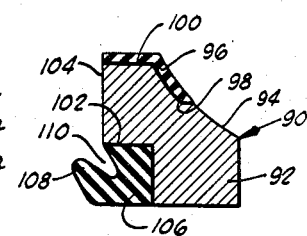
FIG. 7 is an enlarged cross-sectional view through a modified seat assembly.

A modified seat assembly 90 is shown in cross-section in FIG. 7 and may be used in lieu of seat assemblies 64 and 66 of the valve 20. The seat assembly 90 comprises a seating ring 92 of high strength material, such as metal, having an outer diameter slightly less than the diameter of the adjacent portion of the valve chamber in which the seat is used. The front face 94 of the seating ring 92 is shaped to mate with the outer surface of a valve ball. An elastic sealing ring 96 is bonded in a mating groove 98 in the front face 94 and extends from the inner periphery 100 of the seating ring 92 over approximately half of the length of the front face 94 to provide an effective seal against a valve ball. Here again, the sealing ring 96 may be extended over the inner periphery of the seating ring 92 if desired.

An annular groove 102 is formed in the outer end face 104 of the seating ring 92 and extends to the outer periphery of the seating ring. A sealing ring 106 of relatively soft elastic material is bonded to the walls of the groove 102 and preferably extends radially outward beyond the outer periphery of the seating ring 92. In this embodiment, the outer end or lip portion 108 of the sealing ring 106 is tapered and is made of slightly less radial thickness than the lip portion 84 of the sealing ring 82 previously described in order to be more flexible and more easily distorted away from the adjacent body wall and body flange. An annular groove 110 is formed in the outer end face of the sealing ring 106 in order to make the lip portion 108 more responsive to the action of an upstream fluid pressure and facilitate the deflection of the lip portion 108 upon the body pressure relieving operation previously described. It will be understood that the lip portion 108 of the sealing ring 106 extends a substantial distance beyond the outer end face 104 of the seating ring 92 to provide an effective seal against the flow of the upstream fluid around the seating ring 92 into the valve chamber in which the seat assembly is used.

Figure 8:
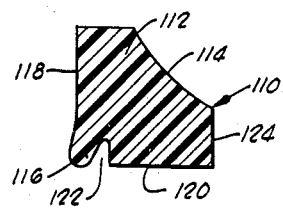
FIG. 8 is another enlarged cross-sectional view of still another seat assembly.

Still another seat assembly 110 is illustrated in FIG. 8 and comprises a ring 112 of a resilient but harder material. For example, the ring 112 may be formed of a natural or synthetic rubber composition having a durometer hardness of from about 80 to 90, or formed from a resilient synthetic resin or plastic material, such as nylon or Teflon. The ring 112 is formed with a front face 114 shaped to mate with a valve ball and is provided with a lip 116 between the outer end face 118 and the outer periphery 120 thereof. In the relaxed condition of the lip 116 as shown in FIG. 8, the lip protrudes outwardly of the outer end face 118 of the ring 112, and the outer periphery of the lip is substantially coterminous with the outer periphery 120 of the main body portion of the ring 112. Also, an annular groove 122 is formed in the outer periphery of the ring 112 to form one side of the lip 116 and provide a space for flexing of the lip 116 toward the inner end face 124 of the ring 112, as will be described. The seat 110 may be either or both an upstream or a downstream seat and is shown as both an upstream and a downstream seat in FIG. 9 engaging opposite sides of the valve ball 42.

When the valve ball 42 is closed as shown in FIG. 9, and when the valve ball is of the floating type as previously described, the ball 42 will be moved downstream by the upstream pressure until the outer end face 118 of the downstream seat 110 engages the downstream body flange 38. The downstream lip 116 will thus be slightly distorted into the respective groove 122 and be in sealing engagement with both the walls of the valve chamber 40 and the adjacent surface of the downstream body flange 38 to prevent the leakage of fluid around the outer periphery of the seat 110. Also, the front face 114 will be in engagement with the adjacent surface of the ball 42, such that the valve is provided with an effective downstream seal.

When the ball 42 moves downstream as shown in FIG. 9, the upstream seat 110 will also be subjected to the upstream fluid pressure and will be moved downstream in the valve chamber 40 with the ball 42 and remain in engagement with the ball 42. In this position of the upstream seat 110, the upstream fluid pressure will react on the outer end face 118 of the upstream seat and the adjacent surface of the lip 116 to press the lip 116 into sealing engagement with the adjacent walls of the valve chamber 40. Thus, the upstream fluid will not be permitted to leak around the outer periphery of the upstream seat 110. Also, of course, the front face 114 of the upstream seat 110 will remain in engagement with the outer surface of the ball 42 to provide an effective upstream seal.

Figure 10:
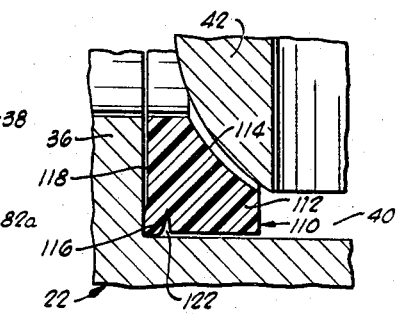
FIG. 10 is a partial cross-sectional view through a ball valve showing one type of action of the upstream seat assembly of the FIG. 8 type when the valve is closed and the body pressure becomes excessive.

In the event there is leakage either between the upstream seat 110 and the ball 42 or between the upstream seat 110 and the adjacent walls of the valve chamber 40, the pressure in the valve chamber 40 between the upstream and downstream seats may become higher than the upstream pressure. In such event, the pressure in the body will normally react across the upstream seat 110 and move the upstream seat 110 upstream toward the body flange 36 as illustrated in FIG. 10. Thus, the front face 114 of the upstream seat 110 will be removed from contact with the adjacent surface of the ball 42 and the excessive body pressure can bleed back upstream between the ball and the upstream seat.

However, should the pressure in the valve chamber 40 become excessive and the upstream seat 110 be stuck in position against the ball 42, then the high pressure fluid in the valve chamber exerts pressure upstream through the annulus between the outer periphery of the upstream seat 110 and the adjacent walls of the valve chamber into the groove 122. This high pressure in the groove 122 acts on the adjacent surface of the lip 116 to deflect the lip 116 radially inward away from the surface of the adjacent walls of the valve chamber 40 as illustrated in FIG. 11. Since the outer end face 118 of the upstream seat is then substantially spaced from the adjacent body flange 36, the lip 116 will not be deflected into sealing engagement with the adjacent surface of the body flange 36. Therefore, the excessive body pressure will bleed or leak around the outer periphery of the upstream seat 110 and around the lip 116 to the inlet of the valve and prevent a dangerous condition from developing.

Still another modified seat assembly 130 for a ball valve is illustrated in FIG. 12. The seat assembly 130 comprises a seating ring 132 of high strength material, such as metal, having a front face 134 shaped to mate with the outer surface of a valve ball and having a horizontally extending circumferential flange 136 on the outer end thereof of a size to slidingly fit in the bore through the body flange 36 to retain the seating ring centered with respect to a valve ball positioned in the valve body 22. The seating ring 132 also has a circumferential flange 138 on the outer periphery thereof.

An elastic material sealing ring 140 is bonded around the outer periphery of the seating ring 132, including the circumferential flange 138. The sealing ring 140 is preferably formed of a rubber composition and has a front face 142 shaped in the same manner as the front face 134 of the seating ring 132, but projecting into the valve chamber 40 a slight distance beyond the front face 134 to provide an effective sealing engagement with the outer surface of a valve ball. Thus, the ring 140 may be considered an extension of the seating ring 132. The outer diameter of the sealing ring 140 is slightly less than the diameter of the adjacent portion of the valve chamber 40 to provide a loose fit of the sealing ring in the valve chamber and provide an annular space 144 between the outer periphery of the sealing ring 140 and the walls of the valve chamber 40. A lip 146 is formed between the outer end face 148 and the outer periphery of the sealing ring 140 to function in the same manner as the lip 116 of the seat assembly 110 shown in FIG. 8 and previously described. An annular groove 150 is formed in the outer periphery of the sealing ring 140 to provide one wall of the lip 146.

It will be apparent that the seat assembly 130 operates in substantially the same manner as the seat assembly 110 previously described. The sliding fit of the seating ring flange 136 in the body flange 36, and the loose fit of the sealing ring 140 in the valve chamber 40 permits the seat assembly 130 to follow the movement of the valve ball positioned in the valve chamber 40. When excessive pressure develops in the valve chamber 40, the excess pressure bleeds through the annular space 144 to deflect the sealing lip 146 into a bypass position, such that the excess pressure can bleed around the seat assembly 130 back into the inlet 32 of the valve.

The novel seat assembly of this invention may also be effectively used in a gate valve construction as illustrated in FIG. 13. In this figure, the gate valve is generally designated by reference character 160 and includes a tubular body 162 having tubular connectors 164 and 166 threadedly secured in the opposite ends thereof. The connector 164 provides an inlet 168 which may be threaded or otherwise adapted for connection with an adjacent section of a flow line and is sealed in the respective end of the body by an O-ring or the like 170. The connector 166 forms an outlet 172 which may also be threaded and is sealed to the respective end of the valve body 162 by an O-ring or the like 174. The space between the inner end 176 of the connector 164 and the inner end 178 of the connector 166 form a valve chamber 180 in the central portion of the valve body 162.

A gate member 182 is positioned in the valve chamber 180 and is supported for vertical reciprocation by a stem 184 secured thereto by a pin 186, such that the gate 182 may move upstream and downstream in the valve chamber 180, as is conventional in gate valve constructions. The stem 184 is connected to a suitable operating mechanism (not shown) carried by a bonnet 188 bolted to the top of the valve body 162 by a plurality of bolts 190 in the conventional manner.

An upstream seat assembly 192 is positioned between the inner end 176 of the connector 164 and the adjacent side of the gate 182 to provide an upstream seat and seal, as will be described. A downstream seat assembly 194 is mounted in the valve chamber 180 between the inner end 178 of the connector 166 and the opposite side of the gate 182 to provide a downstream seat and seal for the gate. The seat assemblies 192 and 194 are constructed in the same manner and are shown enlarged in FIG. 14 to more clearly illustrate the details of construction.

Each of the seat assemblies 192 and 194 comprises a seating ring 196 of high strength material, such as metal, having a front face 198 shaped flat to engage the respective side of the gate 182. An elastic seal ring 200 is bonded in a mating groove in each front face 198 and preferably projects beyond the respective front face 198 to provide a seal against the respective side of the gate 182. An annular groove 202 is formed in the outer end face 204 of each seating ring 196 and extends to the outer periphery of the seating ring. An elastic material sealing ring 206 is bonded to the walls of each groove 202 and the outer end or lip portion 208 thereof projects outwardly beyond the respective seating ring outer end face 204 to be engaged by the respective connector 164 or 166 when the seat assemblies are in operating position in the valve chamber 180. It will also be observed in FIG. 14 that an annular groove 210 is formed in the outer end of each sealing ring 206 in a position to be exposed to fluid reaching the respective seating ring outer end face 204 for purposes to be described. In the event the valve body 162 is provided with a projection 212 in the central portion thereof, each seating ring 196 is also provided with an annular groove 214 in the front face 198 thereof extending from the outer periphery of the seating ring to provide an appreciable clearance over the projection 212 and prevent the respective seating ring from engaging the projection 212 as the seating ring moves back and forth in the valve chamber 180 as will be described.

When the gate 182 is open as indicated in FIG. 14, or is closed and no pressure exists between the inlet 168 and the outlet 172, the seat assemblies 192 and 194 will be positioned as illustrated in both FIGS. 13 and 14 with the outer end faces 204 of the seating rings 196 spaced a short distance from the respective connectors 164 and 166. However, in this position of each seat assembly, the lip portion 208 of the respective sealing ring 206 engages the end of the respective connector 164 or 166 and is appreciably compressed. When the gate 182 is closed and a pressure differential exists between the inlet 168 and the outlet 172, the gate 182 will be moved downstream by the upstream pressure. As the gate 182 moves downstream, it forces the downstream seating ring 196 into contact with the inner end 178 of the connector 166. The downstream sealing ring 206 will thus be further distorted into the respective seating ring groove 202 and effectively prevent the leakage of fluid from the valve chamber 180 around the downstream seat assembly 194. It will also be noted that the gate 182 will remain in sealing engagement with the downstream seal 200, such that the downstream seat assembly 194 will provide an effective downstream seal.

Also, when the gate 182 is moved downstream by fluid pressure, the upstream fluid pressure will act on the upstream seat assembly 192 and move the upstream seating ring 196 downstream in the valve chamber 180 with the gate. The upstream seal 200 thus remains in engagement with the gate 182 to provide an effective upstream seal. Furthermore, the upstream sealing ring 206 is of a size to remain in engagement with the inner end 176 of the connector 164 in the downstream position of the upstream seating ring 196, whereby the upstream fluid tending to flow radially outward between the outer end face 204 of the upstream seating ring 196 and the inner end 176 of the connector 164 will enter the groove 210 of the respective sealing ring 206 and further distort lip portion 208 of the sealing ring 206 into sealing engagement with the walls of the valve chamber 180 and prevent the leakage of fluid around the outer periphery of the upstream seating ring 196.

In the event fluid should leak, either between the upstream seat assembly 192 and the gate 182, or between the upstream seat assembly 192 and the walls of the valve chamber 180, into the valve chamber 180 between the seat assemblies 192 and 194, the pressure may build up in the valve chamber and in the bonnet 188. In such event, the higher pressure in the valve chamber 180 will normally act across the upstream seat assembly 192 and move the seat assembly back upstream away from the gate 182; whereupon the excess pressure can leak between the seat assembly 192 and the gate 182 back upstream. However, should the upstream seat assembly 192 become stuck in the valve chamber 180 and not be capable of sliding back upstream, the excess pressure in the valve chamber will leak around the outer periphery of the seating ring 196 into contact with the upstream sealing ring 206. The pressure of this fluid will therefore deflect the lip portion 208 of the upstream sealing ring radially inward away from the walls of the valve chamber 180 and away from the inner end 176 of the connector 164 to provide a bypass of the fluid from the valve chamber around the outer periphery of the seat assembly 192 back into the inlet of the valve.

From the foregoing it will be apparent that the present invention provides a valve construction wherein provision is made for bleeding off excessive body pressure to prevent development of dangerous conditions. The seat assembly of this invention includes a resilient seal ring around the outer periphery thereof which normally functions to prevent the leakage of fluid into the valve chamber, but which may be deflected or collapsed when excessive pressure is developed in the valve chamber to provide a bleed-off of the excess pressure back into the respective inlet or outlet of the valve. It will also be apparent that the valve constructed in accordance with this invention may be used in either direction, that is, either end of the valve may be used as the upstream end.

Changes may be made in the combination and arrangement of parts or elements as heretofore set forth in the specification and shown in the drawings without departing from the spirit and scope of the invention as defined in the following claims.

What is claimed is:

1. A body-pressure relieving valve, comprising:
  a body having upstream and downstream ends, a valve chamber therein, and inwardly facing shoulders at the upstream and downstream ends of the valve chamber;
  a valve closure member supported in the valve chamber between said shoulders for movement from a neutral position to a downstream position in response to a pressure differential thereacross; and
  a seat assembly in the valve chamber between the valve closure member and the upstream shoulder comprising:
    a seating ring having an outer diameter of a size to provide a sliding fit thereof in the valve chamber in order for the seat assembly to follow the valve closure member when the valve closure member moves downstream, and having a front face on one end thereof shaped to mate with the valve closure member; and
    a resilient lip portion on the seating ring positioned between the outer periphery of the seating ring and the end of the seating ring facing said upstream shoulder, said resilient lip portion extending at an angle to a planar surface of said valve body at its point of contact therewith so that pressure exerted on said lip portion from the upstream side of said seat assembly biases said resilient lip portion into firmer sealing engagement with said planar surface, and pressure exerted on said resilient lip portion from the downstream side thereof biases said resilient lip portion away from said planar surface to bypass fluid from the interior of the valve around the outside of said seat assembly to the upstream end of said valve body, said resilient lip portion thus permitting excessive pressure to be relieved from the interior of the valve body when said seat assembly cannot move to free the front face thereof from contact with said valve closure member and when the pressure to be relieved from the interior of the valve body exceeds the pressure upstream from said seat assembly.

2. A valve as defined in claim 1 wherein the seating ring is formed of metal having an annular groove therein between the end of the seating ring opposite said front face and the outer periphery of the seating ring, and said resilient lip portion is a portion of an outer sealing ring bonded to the walls of said groove.

3. A valve as defined in claim 2 wherein said outer sealing ring has an annular groove in the end thereof opposite said front face positioned radially inward of said lip portion.

4. A valve as defined in claim 2 characterized further to include an inner resilient sealing ring bonded to the front face of the seating ring.

5. A valve as defined in claim 1 wherein said seating ring and lip portion are formed integrally of the same material.

6. A valve as defined in claim 5 wherein said seating ring has an annular groove in the outer periphery thereof forming one side of said lip portion to increase the flexibility of said lip portion.

7. A valve as defined in claim 1 wherein said seating ring comprises an inner metal ring and a ring of resilient material bonded around the outer periphery of the inner metal ring, and said lip portion is an integral part of said ring of resilient material.

8. A valve as defined in claim 7 wherein one end of said ring of resilient material forms a portion of said front face and protrudes beyond the front face portion formed on said inner metal ring.

9. A valve as defined in claim 1 wherein said closure member is a ball.

10. A valve as defined in claim 1 wherein said closure member is a gate.

11. A body-pressure relieving valve, comprising:
  a body having upstream and downstream ends, a valve chamber therein, and inwardly facing shoulders at the upstream and downstream ends of the valve chamber;
  a valve closure member supported in the valve chamber between said shoulders for movement from a neutral position to a downstream position in response to a pressure differential thereacross;
  a first seat assembly in the valve chamber between the valve closure member and the upstream shoulder, comprising:
    a first seating ring having an outer diameter of a size to provide a sliding fit thereof in the valve chamber in order for the first seat assembly to follow the valve closure member when the valve closure member moves downstream, and having a front face on one end thereof shaped to mate with the valve closure member; and
    a resilient lip portion on the first seating ring positioned between the outer periphery of the first seating ring and the end of the first seating ring facing said upstream shoulder, said resilient lip portion extending at an angle to a planar surface of the valve body at its point of contact with said planar surface such that pressure exerted on said resilient lip portion from the upstream side of said seat assembly biases said resilient lip portion into firmer sealing engagement with said planar surface, and pressure exerted on said resilient lip portion from the downstream side of said seat assembly biases said resilient lip portion away from said planar surface to by-pass fluid from the interior of the valve around the outside of said seat assembly whereby excessive pressure within said valve body may be relieved by the passage of fluid around said resilient lip portion when the front face of said sealing ring of said first seat assembly cannot move away from said valve closure member and when the fluid pressure within said valve body exceeds the fluid pressure upstream from said first seat assembly;

a second seat assembly in the valve chamber between the valve closure member and the downstream shoulder comprising:

a second seating ring having an outer diameter of a size to provide a sliding fit thereof in the valve chamber and having a front face on one end thereof shaped to mate with the valve closure member; and a second resilient lip portion on the second seating ring positioned to sealingly engage said downstream shoulder and the adjacent walls of the valve chamber when the second seating ring is moved downstream by the valve closure member.

12. A valve as defined in claim 11 wherein said second seating ring is metal and has an annular groove in the end thereof opposite said front face extending to the outer periphery thereof, and said lip portion is a portion of a resilient sealing ring bonded to the walls of said groove and is sized to be deformed into said groove.

References Cited

UNITED STATES PATENTS

| | | | |
|---|---|---|---|
| 2,599,774 | 6/1952 | Ohls | 251—172 |
| 2,985,421 | 5/1961 | Anderson | 251—172 |
| 3,096,786 | 7/1963 | Rost | 251—172 XR |
| 3,235,224 | 2/1966 | Grove | 251—315 XR |
| 3,272,472 | 9/1966 | Goldman | 251—315 XR |
| 3,297,298 | 1/1967 | Sachnik | 251—317 XR |

FOREIGN PATENTS

| | | |
|---|---|---|
| 572,460 | 4/1959 | Belgium. |
| 1,103,682 | 5/1955 | France. |

WILLIAM F. O'DEA, *Primary Examiner.*

H. W. WEAKLEY, *Assistant Examiner.*